July 7, 1953 G. V. WOODLING 2,644,700
TUBE COUPLING
Filed Feb. 5, 1948
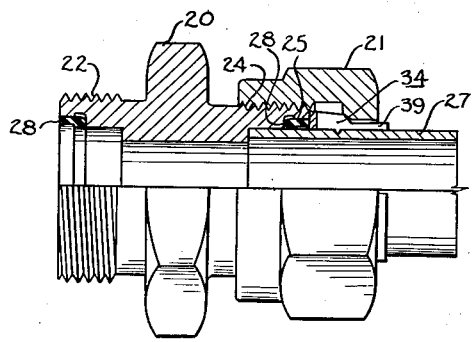
Fig 1
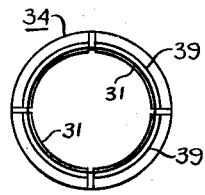
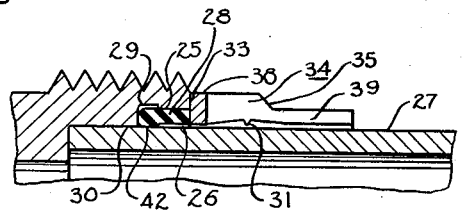
Fig 2
Fig 3
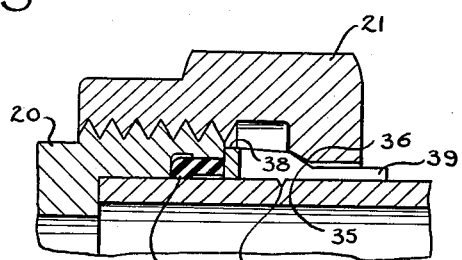
Fig 4
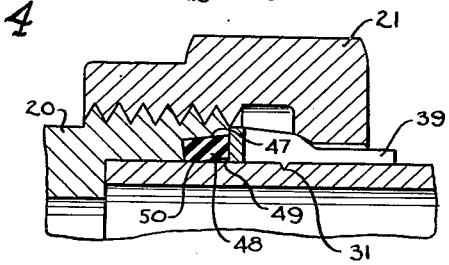
Fig 5
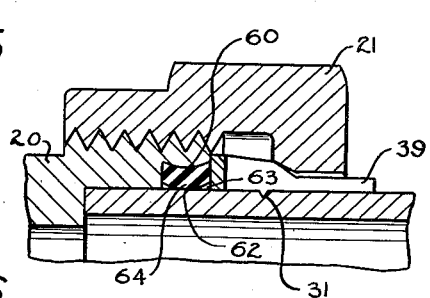
Fig 6
INVENTOR.
George V. Woodling
BY Patented July 7, 1953

2,644,700

UNITED STATES PATENT OFFICE 2,644,700

TUBE COUPLING

George V. Woodling, Cleveland, Ohio

Application February 5, 1948, Serial No. 6,367

1 Claim. (Cl. 285—122)

My invention relates in general to tube couplings for attaching a tube to a fitting element and includes sealing means bonded to the inside of the fitting element and a contractible sleeve for engaging the tube to resist longitudinal pull when the nut is tightened.

An object of my invention is the provision of sealing means bonded to the inside of the fitting element which allows the tube to move therein in a longitudinal direction taken in combination with a contractible sleeve for engaging the tube when the nut is tightened, whereby the combination of the sealing means and the sleeve allows the tube "to take a set" in the sleeve to insure a good gripping action.

Another object of my invention is the provision of bonding sealing means to the inside of the fitting element to prevent extrusion of the sealing means.

Another object of my invention is the provision of sealing means bonded to the inside of the fitting element whereby fluid pressure being sealed may pass around the end of the sealing means and act radially upon the outer surface area of the sealing means to press the inner surface area of the sealing means against the exterior surface of the inner or tube member which is disposed within the fitting element.

Another object of my invention is the provision of a slotted sleeve with contractible finger, in which the sleeve has a solid forward end for abutting against the fitting element and has an internal gripping rib which penetrates the tube when the fingers are contracted against the tube upon the tightening of the nut.

Another object of my invention is to obviate the use of "O" rings by bonding the sealing material directly to the inside of the fitting element and thereby prevent extrusion of the sealing means and at the same time allowing the use of economically manufactured sealing rings.

Another object of my invention is the provision of a contractible slotted sleeve having an internal penetrating rib for engaging the tube, in which the sleeve is made of alloy steel, heat treated and tempered throughout its entirety to render it resilient, hard, and tough, so that the rib makes a smooth burnished penetration to provide a good gripping action.

Another object of my invention is the provision of an alloy steel sleeve, heat treated and tempered throughout its entire mass to render its slotted fingers resilient so as to frictionally support the tube and prevent vibrations from reaching the place where the internal rib engages the tube.

Another object of my invention is the provision of a contractible collar which functions substantially as a lock washer to prevent the sleeve nut from becoming loose under vibration.

Another object of my invention is the provision of a contractible means which is adapted to contract about the tube and which constitutes the only means of holding the tube against longitudinal movement relative to the coupling or fitting element.

Another object of my invention is the provision of a coupling member having a fixed annular wall of predetermined longitudinal extent to receive sealing means comprising an annular body of resilient material having outer and inner surface areas, the outer surface area being mountable in sealing engagement with the fixed annular wall prior ot the insertion of the tube in the coupling member, and the inner surface area being sealingly engageable with the inserted tube for a longitudinal distance less than the longitudinal extent of the fixed annular wall against which the outer surface area engages to effect easy insertion of the tube into the inner surface area.

Another object of my invention is the provision of a coupling member having a fixed annular wall of predetermined longitudinal extent to receive sealing means comprising a hollow sleeve of resilient material, the sleeve having a portion of its length fixedly bonded to the fixed annular wall and having its remaining unbonded portion easily stretchable to effect ready insertion of the tube into the hollow sleeve.

Another object of my invention is the provision of a coupling member having a fixed annular diverging wall or arcuate surface against which the outer surface of the sealing means may be fixedly bonded, so that the inner surface of the sealing means may readily receive the tube.

Other objects and a fuller understanding of my invention may be had by referring to the following description and claim, taken in combination with the accompanying drawing, in which:

Figure 1 is a longitudinal cross-sectional view of a tube fitting embodying my invention, showing the sealing means bonded to the inside of the fitting element and the contractible sleeve which grips the tube;

Figure 2 is an enlarged view of the slotted sleeve only, looking from right to left in Figure 1 and illustrating principally the slotted fingers;

Figure 3 is an enlarged fragmentary cross-sectional view of the parts shown in Figure 1 prior to assembly, the nut being omitted;

Figure 4 is an enlarged fragmentary cross-sectional view of the parts of Figure 3 after assembly and also showing the nut;

Figure 5 is a view similar to Figure 4, but shows a modified form of the bonded sealing means; and Figure 6 is a view similar to Figure 4, but shows another modified form of the bonded sealing means.

With reference to the figures of the drawing, my invention is shown as being applied to a tube fitting or coupling device comprising a coupling or fitting element 20, a tube 27 adapted to be connected thereto, and a sleeve nut 21 into which is mounted a split collar or sleeve 34 adapted to engage or grip the tube 27. The end portions of the fitting element 20 are identical and are provided with male threads 22. The sleeve nut 21 is provided with female threads 24 for engaging the male threads 22. The left-hand end of the fitting element, as shown in Figure 1, may be screwed into a cylinder block or valve or any other apparatus having a threadable opening. The fitting element 20 may be also employed as a coupling for connecting two pipes together, in which case there would be a tube connected to the left-hand end of the fitting element 20. The end portions of the fitting element are provided with a tube bore 30 into which the end of the tube may be freely inserted. As illustrated, the end portions of the fitting element 20 are provided with an enlarged counterbore 25 surrounding the tube for receiving a sealing ring 28 which may be of a rubber-like material.

The enlarged counterbore 25, as best shown in the enlarged figures of the drawing, is substantially cylindrical, and the outer surface of the sealing sleeve 28 is fixedly bonded thereto. The bonding of the sealing sleeve to the cylindrical surface of the counterbore 25 is effected by well-known processes, such as the "Cycleweld" process developed by the Chrysler Corporation or the "Pliobond" process developed by the Goodyear Tire and Rubber Company, or by any other established process. The bonding produces a strong and vibration resistance welded connection, and the sealing sleeve 28 is thus able to resist longitudinal pull of the tube from the coupling member.

The left-hand end of the cylindrical wall of the counterbore 25 terminates into a relief section 29 which has a larger diameter than the cylindrical wall. The outer surface area of the sealing sleeve 28 is fixedly bonded to the cylindrical wall, but is not fixedly bonded to the relief section 29, with the result that the forward or left-hand end of the sealing sleeve 28 remains unbonded so it may readily expand to receive the tube. In Figure 3, the inner surface of the unbonded portion of the sealing sleeve 28 which engages the tube is identified by the reference character 42, with the result that the surface area of the sealing sleeve 28 which engages the tube at 42 has a longitudinal extent less than the longitudinal length of the sealing sleeve, whereby the engagement between the sealing sleeve and the tube does not interfere or prevent the easy insertion of the tube into the sealing sleeve. The unbonded portion at the left-hand end of the sealing sleeve 28 may be easily stretched to receive the tube. As shown in Figure 3, there is a clearance 26 between the inside surface area of the sealing sleeve 28 and the tube, the clearance extending from the right-hand or rearward end of the sealing sleeve up to the inner surface sealing area 42 of the unbonded portion which engages the tube. By reason of the presence of the clearance and by reason of the fact that the unbonded portion may be readily expanded, the tube may be easily inserted within the coupling member prior to assembly.

The split collar or sleeve 34 has a solid forward end 38 and preferably four rearwardly extending spring fingers 39 which frictionally engage the tube when the nut 21 is tightened. The solid forward end 38 abuts against the right hand or rear end surface 33 of the coupling element 20 and entraps the sealing means 28. The outside surface of the gripping split sleeve 34 is provided with a tapered shoulder 35 intermediate its end which is engaged by a tapered shoulder 36 on the nut. Upon tightening the nut, the camming action of the tapered shoulders presses the rearwardly extending spring fingers 39 inwardly against the tube for frictionally supporting the tube against vibration. The inner surface of the split sleeve 34 is provided with a sharp penetrating rib 31 for digging into the tube for holding same against longitudinal pull. Upon tightening the nut, the camming action of the tapered shoulders 35 and 36 bends the spring fingers inwardly and forces the penetrating rib 31 into the tube, as shown in Figure 4. The rib 31 is preferably under the tapered shoulder 35 where the greatest force is applied. The rearwardly extending spring fingers bend sufficiently when the nut is tightened to drive the rib 31 into the tube. The rib 31 is created by recessing or removing material on the inside surface of the sleeve 34 both in front and in rear of the place where the rib is to be made. When the nut is tight, the recessed surfaces are compressed against the tube, so that the rib may penetrate the tube for its full depth. In actual practice, the depth of the rib for a one-half inch tube assembly may be in the order of .015 of an inch and may have a lower included angle at its peak of approximately sixty degrees. When a heavy pull is imposed on the tube, there is no place for the metal of the tube in advance of the internal rib to flow since the recessed surface lies substantially flat against the tube, and there is no "skinning" of the tube. One reason for making the internal rib relatively small in body cross section is that it prevents twisting of the tube as the nut is turned on tight. The sleeve is preferably constructed of alloy steel, which is heat treated and tempered throughout its entire mass to render it resilient, hard and tough with sufficient tensile strength that the fingers 39 spring back and free the tube when the nut is released. The sleeve is preferably made of a chrome-molybdenum steel, known as 4140, and treated to a hardness value of 40 to 45 Rockwell. The penetration of the hard internal rib 31 into the tube creates a burnished smooth surface on each side of the V-shaped groove made by the rib. The spring fingers support the tube by their own resiliency and absorb tube vibrations from reaching the rib.

The frictional engagement which is effected by the spring finger in rear of the internal rib 31 supports the tube against vibration whereby very little vibration is carried or transmitted to the projecting radial engagement of the internal rib into the wall of the tube. Tests show that this sleeve will withstand a great deal of vibration whereby the tube will not break off under severe vibration tests. Since the split collar or sleeve is hardened, the internal rib 31 will not flatten or damage during repeated assembly of the tube fitting. The radial dimension of the internal rib may be substantially less than one-half of the wall thickness of the tube. For example, for a one-half inch tube having a wall thickness of thirty five or forty nine thousandths of an inch, the radial dimension of the internal rib may be in the neighborhood of ten to twenty thousandths of an inch. In actual practice, the radial dimension of the internal rib depends upon the duty or longitudinal pull imposed upon the tube fitting. The Figure 1 is for a one-half inch tube and is drawn substantially to double scale. The Figures 3, 4, 5 and 6 are drawn substantially to four times the scale for a one-half inch tube. The internal rib 31 is preferably provided with a relatively sharp peak for making radial projection inwardly of the wall of the tube. When a heavy pull is imposed on the tube the rib resists such pull, but since there is no place for the metal of the tube in advance of the internal rib to flow, there is no "skinning" of the tube. Mechanical pull tests show that the split collar with the internal rib will withstand extremely high pulling forces, far beyond the rupturing fluid capacity of the tube. While I have preferably illustrated only one such internal rib, the split collar may have a plurality of internal ribs.

When the rubber sealing ring 28 is subjected to high fluid pressure there is a normal tendency for the rubber to extrude along the tube, but since the rubber seal is fixedly bonded to the inside surface of the counterbore 25, it cannot extrude. The bond between the sealing ring and the counterbore overcomes any longitudinal shear due to high pressure. The solid forward end of the gripping sleeve aids in supporting the rubber sealing ring against longitudinal shear where it is bonded to the counter.

In Figure 5, I show a further modified form of the invention, and in this form the counterbore is identified by the reference character 47, and comprises an annular diverging wall against which the outer surface area of the hollow sealing sleeve 48 is fixedly bonded throughout its entire longitudinal extent. The forward and smaller inner surface area of the sealing sleeve 48 is adapted to engage the tube at 50 for a longitudinal extent which is less than the longitudinal extent of the annular diverging wall 47. In other words, a clearance 49 is provided at the entrance of the bore of the hollow sealing sleeve 48 so that the tube may be easily inserted within the coupling member prior to assembly. In view of the fact that the inner surface area of the sealing sleeve engages the tube for a longitudinal distance less than the longitudinal extent of the annular diverging wall 47, the sealing sleeve does not interfere with or prevent the easy insertion of the tube.

The Figure 6 shows the counterbore in the form of an annular arcuate wall 60 against which the sealing means 64 is fixedly bonded so that the inner surface area 62 engages the tube for a longitudinal distance which is shorter than the longitudinal length of the sleeve. Inasmuch as the inner surface area 62 is shorter than the longitudinal extent of the hollow sealing sleeve, it permits the tube to slip easily within the seal. The entrance mouth of the sleeve in Figure 6 provides a clearance 63 for the tube, whereby it may be easily inserted within the hollow sealing sleeve.

The action of the seal plus that of the gripping sleeve creates a new combination, in that the tube may freely move longitudinally in the seal which permits the gripping action of the internal rib to "take a set," thereby insuring a good gripping action which effects a good seal. Thus, the seal does not have to be matched with the gripping sleeve so that close manufacturing tolerances do not have to be maintained for my fitting, nor do rigidly stabilized positions of the tube in fitting element have to be perfectly maintained. Thus, should the tube longitudinally move slightly while taking a "set" in the gripping sleeve incident to high pressure shocks or other pressure loads, the seal means readily permit such movement without damaging the seal. Thus, the seal means and the gripping sleeve materially contribute to each other to make a good tube assembly. In addition, the seal means is affected by the pressure being sealed; thus, the pressure which is being sealed may pass around the end of the seal means and act radially upon the outer surface area of the seal means to press the inner surface area thereof against the exterior surface of the inner or tube member which is disposed within the fitting member.

The bonding of the sealing sleeve or ring 28 to the inside surface of the enlarged counterbore obviates the use of O rings, which are rather expensive to make. The bonding sleeves of the present invention are economical to manufacture in that they may be readily cut off from a tube of rubber-like material and easily bonded to the inside of the counterbore.

In the drawing, the rib 31 comprises four segments, one segment each being on the internal surface of the respective fingers. The removed material or recess on the rearward side of the rib 31 is preferably extended to the rear end of the sleeve to give an increased clearance between the tube and the fingers so that the rib may amply penetrate the tube without encountering too much resistance or opposition by the fingers. The rearward clearance between the tube and the fingers may be slightly less than the radial depth of the rib because the fingers tend to bend slightly to give substantially full penetration to the rib. In this manner, the fingers provide a firm frictional grip to prevent tube vibration from reaching the rib.

Although I have described my invention in its preferred form with a certain degree of particularity, it is understood that the present disclosure of the preferred form has been made only by way of example and that numerous changes may be resorted to without departing from the spirit and the scope of the invention as hereinafter claimed.

What is claimed is:

Sealing construction between an inner and outer member, said inner member having an exterior annular surface, said outer member having an interior annular surface surrounding the exterior annular surface, means including gripping means engaging the inner member for holding the inner member within the outer member, hollow sealing means comprising a body of resilient material having an outer surface area and an inner surface area, said hollow sealing means having a first body portion and a second body portion, said first body portion being internally radially enlarged and having its outer surface area fixedly bonded by bonding means directly to the interior annular surface of the outer member, said interior annular surface and said bonding means holding the inner surface area of said first portion of said hollow sealing means away from the exterior annular surface of the inner member by a small clearance, said outer surface area of said second body portion of said hollow sealing means being unbonded to and spaced from said interior annular surface of the outer member and having its inner surface area thereof sealingly surrounding the exterior annular surface of the inner member to provide a limited sealing contact area with the exterior surface of the inner member, said outer surface area of said second body portion terminating in an end surface area whereby pressure being sealed may pass around said end surface area and act radially upon the outer surface area of the second body portion to press the inner surface area of the second body portion against the exterior surface of the inner member, said first body portion having a terminating end surface area disposed opposite the end surface area of the second body portion, and means to support the terminating end surface of the first body portion against longitudinal movement in opposition to the fluid pressure acting against the end surface area of the second body portion.

GEORGE V. WOODLING.

References Cited in the file of this patent

UNITED STATES PATENTS

| Number | Name | Date |
| --- | --- | --- |
| 1,876,989 | Lormor | Sept. 13, 1932 |
| 2,093,386 | Tear | Sept. 14, 1937 |
| 2,208,620 | Baisch | July 23, 1940 |
| 2,313,780 | Snyder | Mar. 16, 1943 |
| 2,351,363 | Parker | June 13, 1944 |
| 2,396,078 | Box | Mar. 5, 1946 |
| 2,405,489 | Brock | Aug. 6, 1946 |
| 2,423,122 | Stephens | July 1, 1947 |
| 2,434,107 | Folsom | Jan. 6, 1948 |
| 2,452,278 | Woodling | Oct. 26, 1948 |
| 2,472,872 | Woodling | June 14, 1949 |
| 2,477,677 | Woodling | Aug. 2, 1949 |

OTHER REFERENCES

Flodar Tube Fittings Catalog F No. 101 copyright 1945, inside front cover. (Copy in Div. 57.)